(12) United States Patent
Iyer et al.

(10) Patent No.: US 11,922,235 B2
(45) Date of Patent: Mar. 5, 2024

(54) COORDINATING ASYNCHRONOUS COMMUNICATION AMONG MICROSERVICES

(71) Applicant: International Business Machines Corporation, Armonk, NY (US)

(72) Inventors: Chitra A. Iyer, Bangalore (IN); Subramanian Palaniappan, Tiruchirappalli (IN); Prabhakaran Ramalingam, Bangalore (IN); Matheen Ahmed Pasha, Bangalore (IN); Soma Shekar Naganna, Bangalore (IN); Shettigar Parkala Srinivas, Bangalore (IN)

(73) Assignee: International Business Corporation Machines, Armonk, NY (US)

( * ) Notice: Subject to any disclaimer, the term of this patent is extended or adjusted under 35 U.S.C. 154(b) by 0 days.

(21) Appl. No.: 17/523,510

(22) Filed: Nov. 10, 2021

(65) Prior Publication Data
US 2023/0142108 A1 May 11, 2023

(51) Int. Cl.
*G06F 9/54* (2006.01)
(52) U.S. Cl.
CPC ........ *G06F 9/546* (2013.01); *G06F 2209/548* (2013.01)
(58) Field of Classification Search
CPC .............................. G06F 9/546; G06F 2209/548
See application file for complete search history.

(56) References Cited

U.S. PATENT DOCUMENTS

| 2006/0056628 A1* | 3/2006 | Todd | H04L 67/55 |
|---|---|---|---|
| | | | 380/233 |
| 2009/0006559 A1* | 1/2009 | Bhogal | H04L 12/1818 |
| | | | 709/206 |

(Continued)

OTHER PUBLICATIONS

Shi, Yulong et al. Topic-Oriented Bucket-Based Fast Multicast Routing in SDN-Like Publish/Subscribe Middleware. IEEE Open Access Journal, pp. 89741-89756, May 12, 2020, Electronic ISSN: 2169-3536, INSPEC Accession No. 19659423, DOI: 10.1109/ACCESS.2020.2994268.

(Continued)

*Primary Examiner* — Charles E Anya
(74) *Attorney, Agent, or Firm* — The Steadman Law Firm PLLC

(57) ABSTRACT

Techniques are described relating to coordinating asynchronous communication among a plurality of client microservices in a managed services domain of a cloud computing environment. An associated computer-implemented method includes receiving at a single request topic queue of a message broker application programming interface (API) at least one message associated with a topic from at least one publisher microservice among the plurality of client microservices. The method further includes identifying an authorization identification parameter included in each of the at least one message. The method further includes publishing each of the at least one message to a respective bucket within a single response topic queue of the message broker API, the respective bucket corresponding to one of at least one subscriber microservice among the plurality of client microservices associated with the authorization identification parameter included in the message.

9 Claims, 10 Drawing Sheets

(56) References Cited

U.S. PATENT DOCUMENTS

| | | | | |
|---|---|---|---|---|
| 2011/0258268 | A1* | 10/2011 | Banks | G06Q 10/06 |
| | | | | 709/206 |
| 2012/0198004 | A1* | 8/2012 | Watte | H04L 51/043 |
| | | | | 709/206 |
| 2013/0024538 | A1* | 1/2013 | Fateev | H04L 67/02 |
| | | | | 709/213 |
| 2013/0304826 | A1* | 11/2013 | Li | H04L 51/214 |
| | | | | 709/206 |
| 2016/0248871 | A1* | 8/2016 | Seed | H04W 4/70 |
| 2018/0048638 | A1 | 2/2018 | Lewis et al. | |
| 2018/0083826 | A1 | 3/2018 | Wilson et al. | |
| 2018/0097748 | A1* | 4/2018 | Pienescu | G06F 16/285 |
| 2019/0089809 | A1* | 3/2019 | Theebaprakasam | H04L 67/02 |
| 2020/0067903 | A1 | 2/2020 | Yegorin | |

OTHER PUBLICATIONS

Mell, Peter et al. The NIST Definition of Cloud Computing. National Institute of Standards and Technology, U.S. Department of Commerce, NIST Special Publication 800-145, Sep. 2011, 7 pages.

* cited by examiner

COORDINATING ASYNCHRONOUS COMMUNICATION AMONG MICROSERVICES

BACKGROUND

The various embodiments described herein generally relate to message handling among microservices. More specifically, the various embodiments describe techniques of coordinating asynchronous communication among a plurality of client microservices in a managed services domain of a cloud computing environment.

SUMMARY

The various embodiments described herein provide techniques of coordinating asynchronous communication among a plurality of client microservices. According to an embodiment, an associated computer-implemented method includes receiving at a single request topic queue of a message broker application programming interface (API) at least one message associated with a topic from at least one publisher microservice among the plurality of client microservices. The method further includes identifying an authorization identification parameter included in each of the at least one message. The method further includes publishing each of the at least one message to a respective bucket within a single response topic queue of the message broker API, the respective bucket corresponding to one of at least one subscriber microservice among the plurality of client microservices associated with the authorization identification parameter included in the message.

One or more additional embodiments pertain to a computer program product including a computer readable storage medium having program instructions embodied therewith. According to such additional embodiment(s), the program instructions are executable by a computing device to cause the computing device to perform one or more steps of and/or to implement one or more embodiments associated with the above recited computer-implemented method. One or more further embodiments pertain to a system having at least one processor and a memory storing an application program, which, when executed on the at least one processor, performs one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
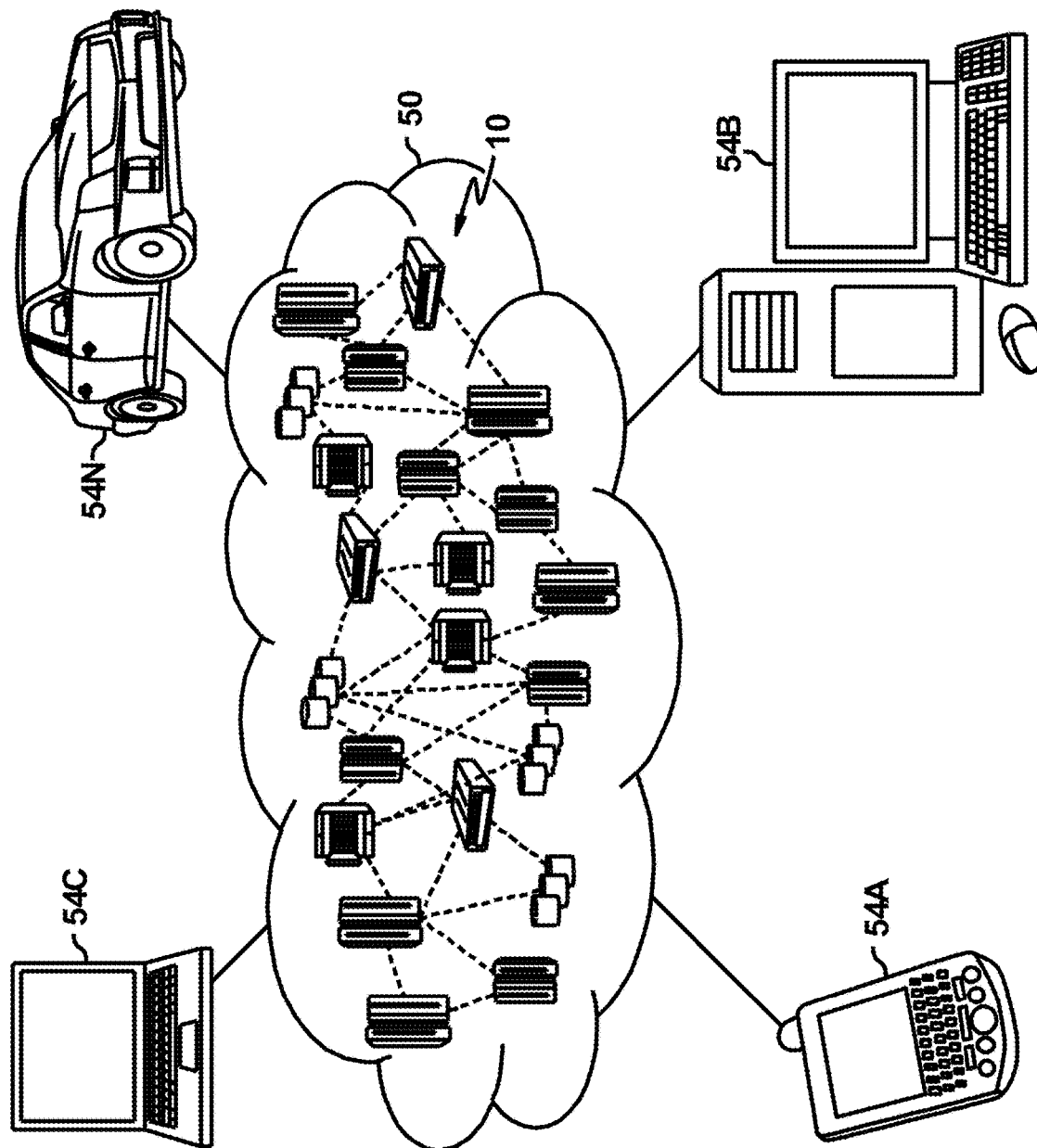
FIG. 1 depicts a cloud computing environment, according to one or more embodiments.

The various embodiments described herein are directed to techniques of coordinating asynchronous communication among client microservices in a managed services domain of a cloud computing environment, e.g., a virtualized environment in which one or more computing capabilities are available as a service. In the context of the various embodiments, a client microservice is an independently deployable service or component associated with one or more client applications. A client microservice optionally has an individual technology stack and/or optionally is organized by business capability. Each client microservice enables a respective action type or a respective set of action types associated with a certain workflow and/or a certain task. A cloud server application of a cloud server system configured to coordinate client microservice communication may incorporate a message broker application programming interface (API) having a capability to process messages among the client microservices. A respective message received at the message broker API for publication in accordance with the various embodiments includes an authentication identification parameter (or authentication identification parameters) associated with a subscriber microservice (or subscriber microservices) among the client microservices to which the respective message is destined. The various embodiments enable publication of messages to respective buckets within a response topic queue that are associated with subscriber microservices. In the context of the various embodiments, a bucket is a logical topic queue partition configured to store data, including messages, associated with a respective subscriber microservice. Optionally, a bucket is or includes a container or buffer.

The various embodiments described herein may have advantages over conventional techniques. Specifically, the various embodiments improve computer technology by enabling storage of messages in a topic queue of a message broker API within buckets respectively associated with subscriber microservices. Such bucket-based implementation facilitates targeted message publication to subscriber microservices. Targeted message publication permits a subscriber microservice to prepare for resource requirements associated with any published message. Additionally, such bucket-based implementation facilitates message privacy and/or security among subscriber microservices by enabling message access control based upon bucket access. The various embodiments further enable dynamic creation of a bucket for a new subscriber microservice at runtime, thus facilitating topic queue scalability. The various embodiments further enable use of a single request topic queue and a single response topic queue, or alternatively use of a single request-response topic queue, for a certain topic addressed by a message broker API. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to asynchronous communication coordination in a managed services domain. However, it is to be understood that the techniques described herein may be adapted to a variety of purposes in addition to those specifically described herein. Accordingly, references to specific embodiments are included to be illustrative and not limiting.

The various embodiments described herein may be provided to end users through a cloud computing infrastructure. It is to be understood that although this disclosure includes a detailed description on cloud computing, implementation of the teachings recited herein are not limited to a cloud computing environment. Rather, the various embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Thus, cloud computing allows a user to access virtual computing resources (e.g., storage, data, applications, and even complete virtualized computing systems) in the cloud, without regard for the underlying physical systems (or locations of those systems) used to provide the computing resources. This cloud model may include at least five characteristics, at least three service models, and at least four deployment models.

Characteristics are as follows:

On-demand self-service: A cloud consumer can unilaterally provision computing capabilities, such as server time and network storage, as needed automatically without requiring human interaction with the provider of the service.

Broad network access: Capabilities are available over a network and accessed through standard mechanisms that promote use by heterogeneous thin or thick client platforms (e.g., mobile phones, laptops, and personal digital assistants (PDAs)).

Resource pooling: The computing resources of the provider are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): The capability provided to the consumer is to use the applications of the provider running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: The cloud infrastructure is operated solely for an organization. It may be managed by the organization or a third party and may exist on-premises or off-premises.

Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The cloud infrastructure is made available to the general public or a large industry group and is owned by an organization selling cloud services.

Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 illustrates a cloud computing environment 50, according to an embodiment. As shown, cloud computing environment 50 may include one or more cloud computing nodes 10 with which local computing devices used by cloud consumers, such as, for example, PDA or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. Accordingly, cloud computing environment 50 may offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
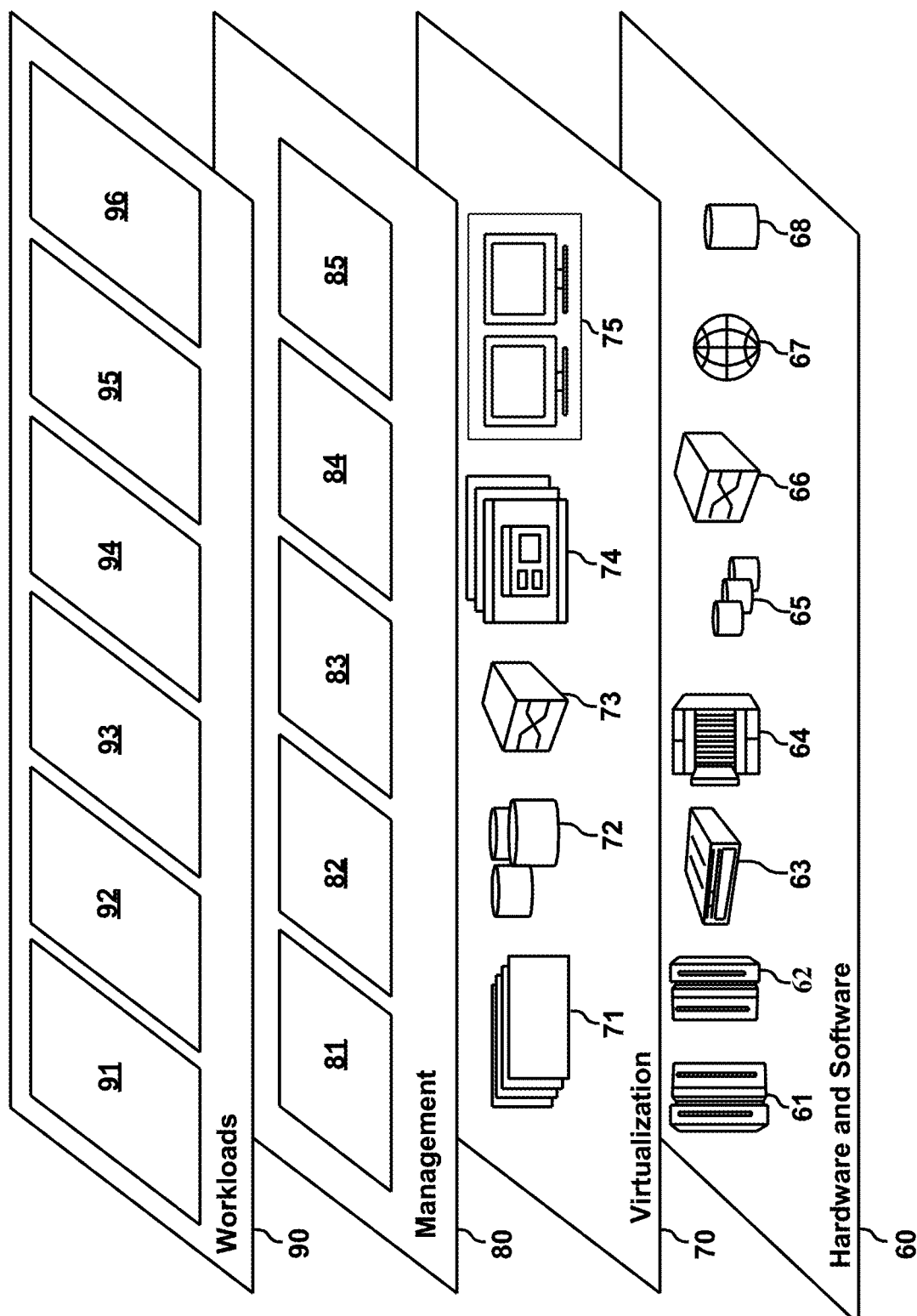
FIG. 2 depicts abstraction model layers provided by a cloud computing environment, according to one or more embodiments.

FIG. 2 illustrates a set of functional abstraction layers provided by cloud computing environment 50, according to an embodiment. It should be understood in advance that the components, layers, and functions shown in FIG. 2 are intended to be illustrative only; embodiments of the invention are not limited thereto. As depicted, various layers and corresponding functions are provided. Specifically, hardware and software layer 60 includes hardware and software components. Examples of hardware components may include mainframes 61, RISC (Reduced Instruction Set Computer) architecture based servers 62, servers 63, blade servers 64, storage devices 65, and networks and networking components 66. In some embodiments, software components may include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 may provide dynamic procurement of computing resources and other resources that are utilized to perform tasks within cloud computing environment 50. Metering and pricing 82 may provide cost tracking as resources are utilized within cloud computing environment 50, and billing or invoicing for consumption of these resources. In one example, these resources may include application software licenses. Security provides identity verification for cloud consumers and tasks, as well as protection for data and other resources. User portal 83 may provide access to the cloud computing environment for consumers and system administrators. Service level management 84 may provide cloud computing resource allocation and management such that required service levels are met. Service Level Agreement (SLA) planning and fulfillment 85 may provide pre-arrangement for, and procurement of, cloud computing resources for which a future requirement is anticipated in accordance with a SLA.

Workloads layer 90 provides examples of functionality for which cloud computing environment 50 may be utilized. Examples of workloads and functions which may be provided from this layer include: mapping and navigation 91; software development and lifecycle management 92; virtual classroom education delivery 93; data analytics processing 94; transaction processing 95; and microservice message handling 96. Microservice message handling 96 may enable coordination of asynchronous communication among client microservices in accordance with the various embodiments described herein.

Figure 3:
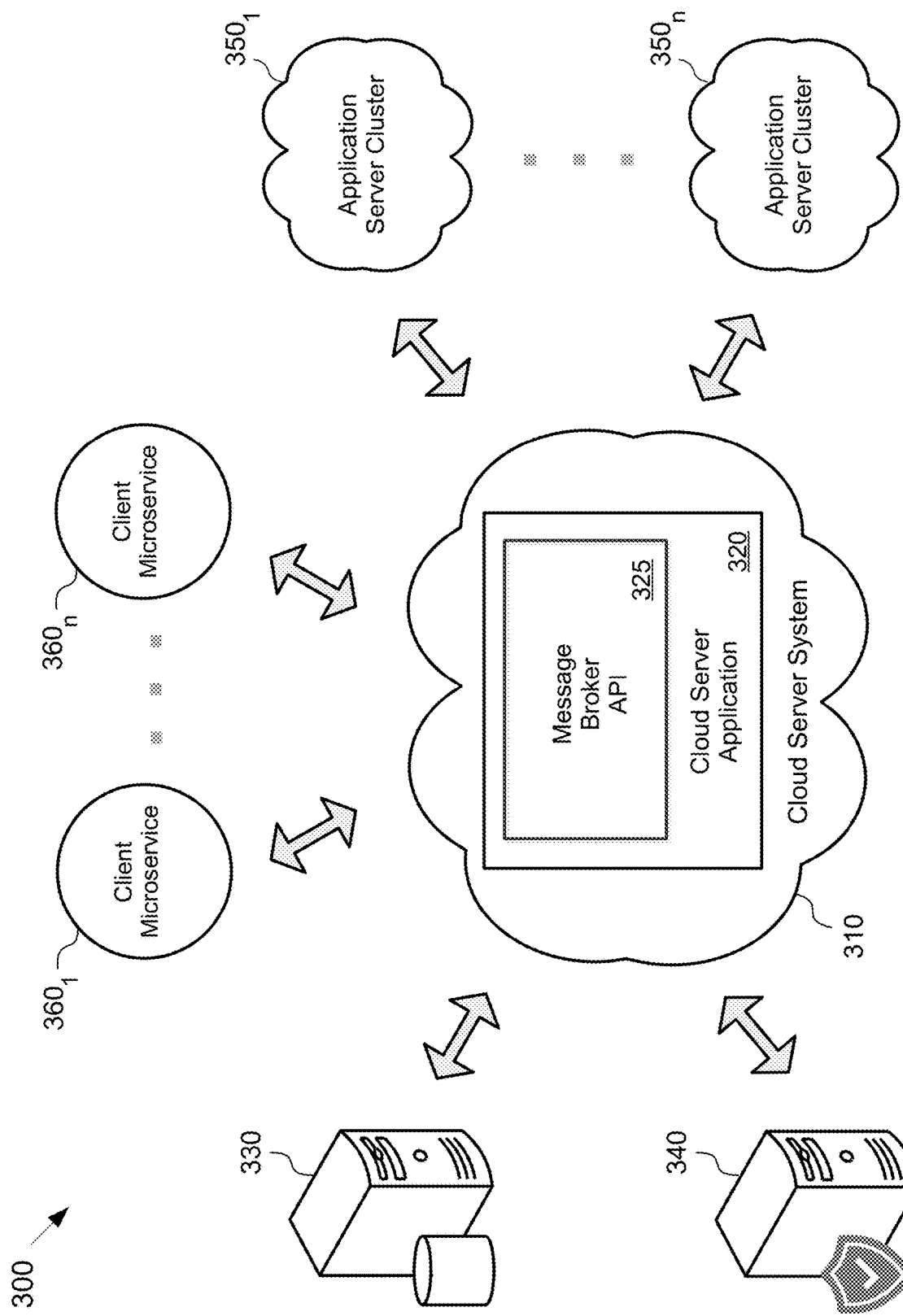
FIG. 3 depicts a managed services domain in a cloud computing environment, according to one or more embodiments.

FIG. 3 illustrates a managed services domain 300 within cloud computing environment 50. As shown, managed services domain 300 includes a cloud server system 310. In an embodiment, cloud server system 310 includes a cloud server application 320, which may be capable of enabling and/or facilitating message handling in accordance with the various embodiments described herein. Cloud server application 320 includes a message broker API 325. Furthermore, as shown, managed services domain 300 includes a database system 330, a directory server system 340, and a plurality of application server clusters $350_1$ to $350_n$. Message broker API 325 is configured to process and publish messages received from client microservices $360_1$ to $360_n$. Moreover, in an embodiment, cloud server application 320 and optionally other component(s) of cloud server system 310 are configured to communicate with database system 330, directory server system 340, application server clusters $350_1$ to $350_n$, and/or client microservices $360_1$ to $360_n$.

Database system 330 includes one or more database servers, which may store and/or manage various data aspects related to message handling as facilitated by cloud server application 320. In an embodiment, database system 330 stores relationships among the plurality of application server clusters $350_1$ to $350_n$. In an additional embodiment, database system 330 stores relationships and/or other data aspects associated with client microservices $360_1$ to $360_n$. In a further embodiment, database system 330 is managed via a database management system (DBMS). In a further embodiment, database system 330 includes one or multiple databases, some or all of which may be relational databases manageable by a relational database management system (RDBMS). In a further embodiment, database system 330 includes one or more ontology trees or other ontological structures. Directory server system 340 facilitates authentication of client microservices $360_1$ to $360_n$ and/or other clients associated with managed services domain 300. In an embodiment, directory server system 340 facilitates client authentication with respect to one or more of application server clusters $350_1$ to $350_n$. For purposes of authentication with respect to one or more of a plurality of applications in managed services domain 300, e.g., cloud server application 320, a client among client microservices $360_1$ to $360_n$ or other client may provide relevant environment details and credentials relevant to such application(s). Application server clusters $350_1$ to $350_n$ store aspects of various applications as well as provide managed server services to client microservices $360_1$ to $360_n$ and/or other clients. In a further embodiment, some or all application servers within application server clusters $350_1$ to $350_n$ are configured to communicate with one another.

Figure 4:
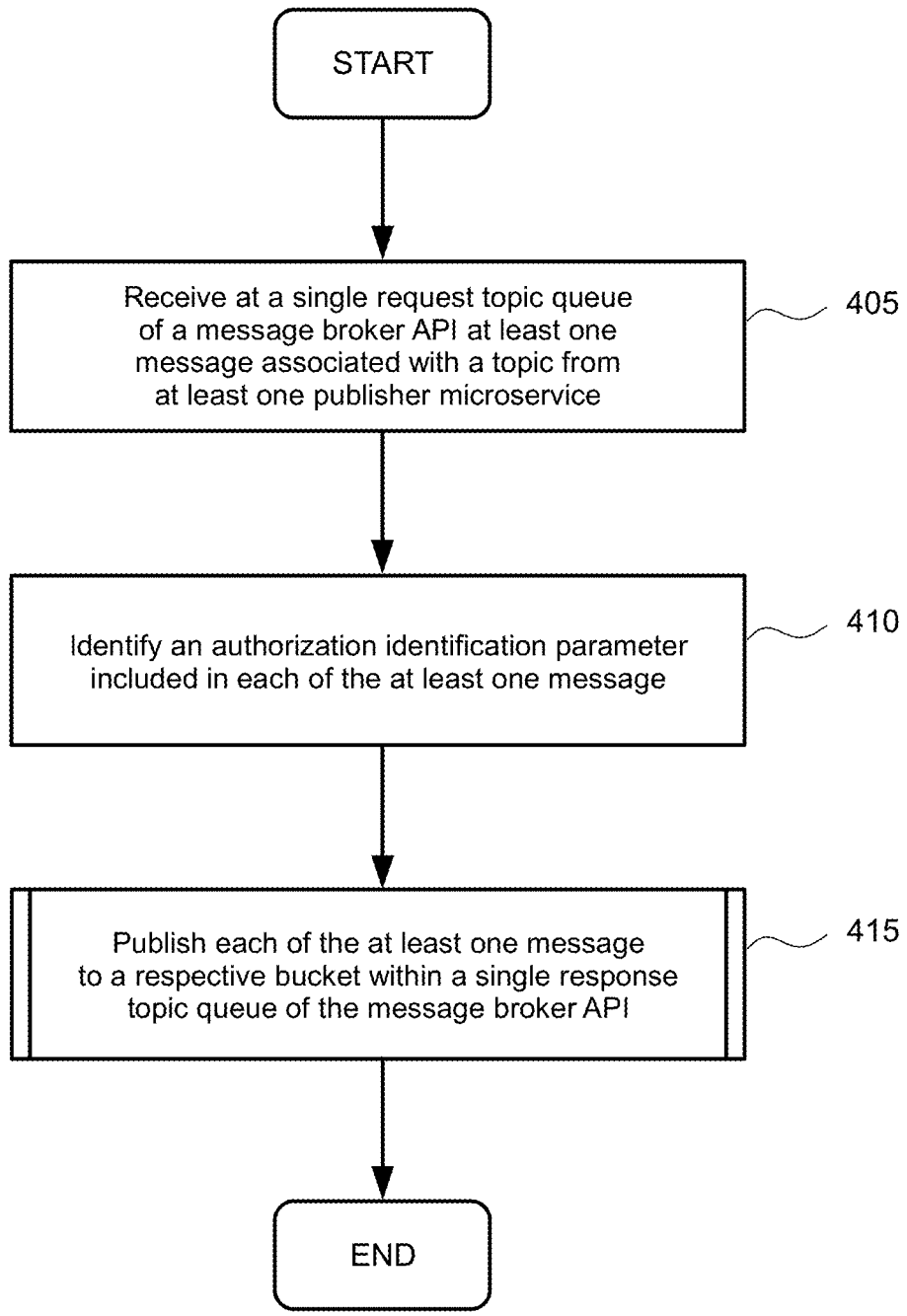
FIG. 4 illustrates a method of coordinating asynchronous communication among a plurality of client microservices, according to one or more embodiments.

FIG. 4 illustrates a method 400 of coordinating asynchronous communication. In an embodiment, one or more steps associated with the method 400 are carried out in an environment in which computing capabilities are provided as a service (e.g., cloud computing environment 50). According to such embodiment, one or more steps associated with the method 400 are carried out in a managed services domain within a cloud computing environment (e.g., managed services domain 300). The cloud computing environment optionally is a hybrid cloud environment. In an additional embodiment, one or more steps associated with the method 400 are carried out in one or more other environments, such as a client-server network environment or a peer-to-peer network environment. A cloud server application in a managed services domain (e.g., cloud server application 320 of cloud server system 310 in managed services domain 300) facilitates processing according to the method 400 and related methods described herein. The message handling techniques facilitated or otherwise carried out via the cloud server application in the managed services domain may be associated with microservice message handling capabilities within a workloads layer among functional abstraction layers provided by the cloud computing environment (e.g., microservice message handling 96 within workloads layer 90 of cloud computing infrastructure 50). In accordance with the method 400, the cloud server application coordinates asynchronous communication among a plurality of client microservices in the managed services domain (e.g., client microservices $360_1$ to $360_n$).

In the context of the method 400 and related methods described herein, the cloud server application provides, or is capable of providing, a client (or legal representative(s) of the client) as well as any other authorized entity associated with asynchronous communication advance notice of any personal data collection. The server application further provides any affected entity an option to opt in or opt out of any such personal data collection at any time. Optionally, the server application further transmits at least one notification to any affected entity each time any such personal data collection occurs and/or at designated time intervals.

In an embodiment, the method 400 begins at step 405, where the cloud server application receives at a single request topic queue of a message broker API (e.g., message broker API 325) at least one message associated with a topic from at least one publisher microservice among the plurality of client microservices. The message broker API is associated with the cloud server application and is configured to handle asynchronous messaging aspects in accordance with the various embodiments. Topics associated with the various embodiments are open ended and optionally are applicable in the context of any message-based communication. Topic queues within the message broker API are associated with respective topics and are implementation dependent. The message broker API is a general framework for message processing that optionally handles a respective topic or a topical class or alternatively handles multiple topics or topical classes. In an embodiment, the message broker API is configured to handle a plurality of topics, including the topic with which the at least one message received at step 405 is associated. In a further embodiment, the cloud server application dynamically allocates memory for topic queue creation within a message broker API at runtime based upon microservice messaging demands. In a further embodiment, the cloud server application facilitates creation and/or maintenance of a respective request topic queue within the message broker API for each of a plurality of topics, including creation and/or maintenance of the single request topic queue for the topic with which the at least one message received at step 405 is associated. According to such further embodiment, the single request topic queue is dedicated to the topic with which the at least one message is associated. In the context of the various embodiments, a publisher microservice is a client microservice sending for publication at least one message with regard to a topic. In the context of the method 400, the at least one publisher microservice sends the at least one message to the message broker API for publication. In a further embodiment, according to step 405 the cloud server application receives at the single request topic queue each of the at least one message, regardless of any condition associated with the message.

In an embodiment, each of the at least one message received at step 405 includes a message key parameter, a message value, and an authorization identification parameter. In an additional embodiment, the message key parameter facilitates message aggregation. According to such additional embodiment, the cloud server application utilizes the message key parameter to group messages and/or to handle partitioning of topics. With regard to topic partitioning, messages with a same message key optionally are organized into a respective topic partition. In a further embodiment, the cloud server application determines message routing, e.g., routing of one or more messages among the at least one message received at step 405, based upon the message key parameter. In a further embodiment, the message value included in a respective message among the at least one message includes or otherwise indicates a message payload. The message payload includes information to be transmitted via the relevant message, e.g., data and/or request(s) intended for a message recipient.

The authorization identification parameter included in a respective message among the at least one message optionally is represented by a character, numerical, or string data type, e.g., a "bucket_auth_id" variable value in character, integer, or string format. The authorization identification parameter indicates an intended destination microservice. If a destination microservice associated with a respective message among the at least one message is a subscriber microservice among the plurality of client microservices, as further described herein the cloud server application publishes the message to the subscriber microservice associated with the authorization identification parameter included in the respective message. In an embodiment, one or more of the at least one message received at step 405 includes an authorization identification parameter in a respective message header. In an additional embodiment, one or more of the at least one message received at step 405 includes an authorization identification parameter within the message body, optionally partitioned from other message content. As described below, optionally at least one message among the at least one message received at step 405 includes multiple authorization identification parameters.

At step 410, the cloud server application identifies an authorization identification parameter included in each of the at least one message. In an embodiment, the cloud server application identifies the authorization identification parameter in a message among the at least one message by processing a message header including the authorization identification parameter. In a further embodiment, the cloud server application identifies the authorization identification parameter in a message among the at least one message by parsing the message to separate the authorization identification from other portions of the message. In one or more embodiments, at least one respective message among the at least one message includes multiple authorization identification parameters. According to such one or more embodiments, the cloud server application identifies each of the multiple authorization identification parameters included in the at least one respective message, e.g., by processing a message header of one or more of the at least one respective message including the multiple authorization identification parameters and/or by parsing one or more of the at least one respective message to separate the multiple authorization identification parameters from other message portions.

At step 415, the cloud server application publishes each of the at least one message to a respective bucket within a single response topic queue of the message broker API. The respective bucket to which the cloud server application publishes each message among the at least one message corresponds to one of at least one subscriber microservice among the plurality of client microservices associated with the authorization identification parameter included in the message. Accordingly, the respective bucket corresponds to a subscriber microservice that is associated with the authorization identification parameter included in the message. A bucket is logical partition of the single response topic queue. One or more buckets associated with the single response topic queue are respective logical partitions of such queue. In certain contexts, particularly with respect to message processing, the cloud server application handles each bucket as a separately functional data structure, e.g., a separately functional queue. In an embodiment, each bucket within the single response topic queue corresponds to a single subscriber microservice among the plurality of client microservices. According to such embodiment, the cloud server application assigns each bucket a correspondence relationship to a single subscriber microservice such that there is a one-to-one correspondence between a respective bucket and a respective subscriber microservice. In an alternative embodiment, at least one bucket within the single response topic queue corresponds to multiple subscriber microservices. According to such alternative embodiment, the respective bucket to which the cloud server application publishes each message among the at least one message at step 415 corresponds to one or more subscriber microservices associated with the authorization identification parameter included in the message. According to such alternative embodiment, multiple subscriber microservices optionally are associated with a single authorization identification parameter. In a further embodiment, the cloud server application facilitates creation and/or maintenance of a respective response topic queue within the message broker API for each of a plurality of topics, including creation and/or maintenance of the single response topic queue for the topic with which each of the at least one message published according to step 415 is associated. According to such further embodiment, the single response topic queue is dedicated to the topic with which the at least one message is associated.

In the context of the various embodiments, a subscriber microservice is a client microservice subscribing to a topic. In the context of the method 400, the at least one subscriber microservice is subscribed to the topic with which the at least one message is associated. The single response topic queue is configured to store messages associated with the topic with which the at least one message is associated in a respective bucket based upon authorization identification parameter. As further described herein with respect to FIG. 6, a respective client microservice among the plurality of client microservices subscribes to the topic with which the at least one message is associated by sending a subscription request to the cloud server application, the subscription request including at least one subscriber identification attribute associated with the respective client microservice. As further described herein, consequent to sending the subscription request, the cloud server application creates a bucket within the single response topic queue corresponding to the respective client microservice. According to step 415, the cloud server application publishes each of the at least one message by placing each message into a respective bucket within the single response topic queue based upon the authorization identification parameter included in the message. Since each bucket within the single response topic queue corresponds to a subscriber microservice among the plurality of client microservices, and since each subscriber microservice is associated with an authorization identification parameter, according to step 415 the cloud server application publishes each of the at least one message to a respective bucket corresponding to a subscriber microservice that is associated with the authorization identification parameter included in the message.

In an embodiment, responsive to determining that a respective message among the at least one message includes an authorization identification parameter associated with a respective client microservice that does not correspond to any bucket within the single response topic queue, i.e., a non-subscribing client microservice, the cloud server application optionally refrains from publishing the respective message. For instance, in the context of the method 400, assuming that a publisher microservice MS2 transmits to the message broker API a certain message destined for a microservice MS7, the cloud server application refrains from publishing the certain message if microservice MS7 does not correspond to any bucket within the single response topic queue, since in this scenario microservice MS7 is not subscribed to the topic with which the message is associated. In a further embodiment, responsive to determining that a respective message among the at least one message includes an authorization identification parameter associated with a respective client microservice that does not correspond to any bucket within the single response topic queue, the cloud server application stores the respective message for future potential publication, e.g., in a holdover data structure. The holdover data structure optionally is a holdover queue separate from the single response topic queue or alternatively is a holdover bucket or other partition within the single response topic queue. According to such further embodiment, upon topic subscription of the respective client microservice associated with the authorization identification parameter included in the respective message, the cloud server application optionally publishes the respective message stored in the holdover data structure to the single response topic queue according to step 415, e.g., optionally transfers the respective message from the holdover data structure to a newly created bucket within the single response topic queue corresponding to the respective client microservice.

In the context of the various embodiments, the single request topic queue and the single response topic queue facilitate topical organization of messages according to bucket-based authorization. To enable bucket-based authorization processing, messages include the authorization identification parameter in addition to the message key parameter and the message value. According to one or more embodiments in which at least one respective message among at least one message published includes multiple authorization identification parameters, the cloud server application publishes the at least one respective message to multiple buckets within the single response topic queue, the multiple buckets corresponding to respective subscriber microservices associated with the multiple authorization identification parameters included in the at least one respective message. Accordingly, consequent to such bucket-based publication, the respective subscriber microservices associated with the multiple authorization identification parameters included in the at least one respective message may access the at least one respective message via the multiple buckets. In the context of the various embodiments, publishing a respective message among the at least one message may be referred to as pushing the respective message.

In an embodiment, the cloud server application enables at least one bucket safeguard to ensure privacy and/or security of messages published to each respective bucket within the single response topic queue. According to such embodiment, the cloud server application enables message access control based upon bucket access, such that messages published to the respective bucket are accessible only to a subscriber microservice corresponding to the respective bucket. According to such embodiment, the cloud server application restricts access to messages published to a respective bucket to a subscriber microservice corresponding to the respective bucket, thus restricting or preventing sharing of messages published to the respective bucket among other subscriber microservices not in correspondence with the respective bucket. By publishing according to such embodiment, the cloud server application may preserve security benchmarks among the plurality of client microservices.

Upon bucket publication of a respective message among the at least one message including an authorization identification parameter, consequent to topic subscription a respective subscriber microservice associated with the authorization identification parameter is automatically notified of the respective message. In an embodiment, the cloud server application is configured to automatically notify a respective subscriber microservice among the at least one subscriber microservice upon publication of a message to a respective bucket corresponding to the respective subscriber microservice. In a related embodiment, the cloud server application sends, optionally via the message broker API, a publication notification message to a subscriber microservice upon publishing a respective message to a respective bucket corresponding to the subscriber microservice. According to such related embodiment, the cloud server application enables both targeted publication of a respective message and targeted notification regarding the publication based upon the authorization identification parameter included in the respective message. Targeted publication notification enables the subscriber microservice to which the cloud server application publishes a respective message to be prepared with resource requirements associated with the respective message and further avoids unnecessary publication notification to client microservices unassociated with the respective message. In an additional embodiment, a respective subscriber microservice among the at least one subscriber microservice is configured to repetitively check for messages published to a respective bucket within the single response topic queue corresponding to the respective subscriber microservice. According to such additional embodiment, the at least one subscriber microservice optionally interfaces with the single response topic queue at periodic intervals and/or at designated points in time, e.g., in accordance with a messaging protocol. Publication to a respective bucket according to step 415 enables a respective subscriber microservice to avoid searching or parsing messages irrelevant to any data associated with the respective subscriber service and irrelevant to any service rendered via the respective subscriber microservice. A method of publishing each of the at least one message to a respective bucket within the single response topic queue in accordance with step 415 is described with respect to FIG. 5.

In an embodiment, in the context of the method 400 and related methods described herein, one or more of the at least one publisher microservice are among the at least one subscriber microservice. In an analogous embodiment, in the context of the method 400 and related methods, one or more of the at least one subscriber microservice are among the at least one publisher microservice. In a further embodiment, one or more client microservices publish and subscribe to a same topic, e.g., the topic with which the at least one message is associated in the context of the method 400 and related methods. According to such further embodiment, one or more client microservices both publish to the single request topic queue and subscribe to the single response topic queue.

In one or more embodiments, the single request topic queue of the message broker API as described in the context of the method 400 and related methods is dedicated to facilitating receipt of the at least one message from the at least one publisher microservice according to step 405, and the single response topic queue of the message broker API is dedicated to facilitating publication of each of the at least one message to the at least one subscriber microservice according to step 415. According to such one or more embodiments, each of the at least one publisher microservice among the plurality of client microservices sends to the dedicated single request topic queue message(s) for publication, and each of the at least one subscriber microservice among the plurality of client microservices subscribes to the dedicated single response topic queue. In one or more alternative embodiments, the single request topic queue of the message broker API and the single response topic queue of the message broker API as described in the context of the method 400 are combined into a single request-response topic queue. According to such one or more alternative embodiments, optionally one or more client microservices among the plurality of client microservices both publish and subscribe to the single request-response topic queue. Optionally, the single request-response topic queue includes all or some functionality of the single request topic queue, and further includes all or some functionality of the single response topic queue, as described in the context of the method 400 and related methods.

By configuring the single request topic queue and the single response topic queue for the topic with which the at least one message is associated according to the method 400, the cloud server application prevents inefficient proliferation of topic queues associated with the topic and further prevents unintended sharing of messages across topics. Topic queue configuration in accordance with the various embodiments facilitates scaling of the message broker API to handle multiple subscriber microservices among the plurality of client microservices and messages associated therewith. Furthermore, by configuring buckets within the single response topic queue for the topic with which the at least one message is associated according to the method 400, the cloud server application enables targeted message publication to respective subscriber microservices and facilitates preservation of message privacy and/or security.

In sum, coordinating asynchronous communication among a plurality of client microservices according to the method 400 includes receiving at a single request topic queue of a message broker API at least one message associated with a topic from at least one publisher microservice among the plurality of client microservices, identifying an authorization identification parameter included in each of the at least one message, and publishing each of the at least one message to a respective bucket within a single response topic queue of the message broker API, the respective bucket corresponding to one of at least one subscriber microservice among the plurality of client microservices associated with the authorization identification parameter included in the message.

Figure 5:
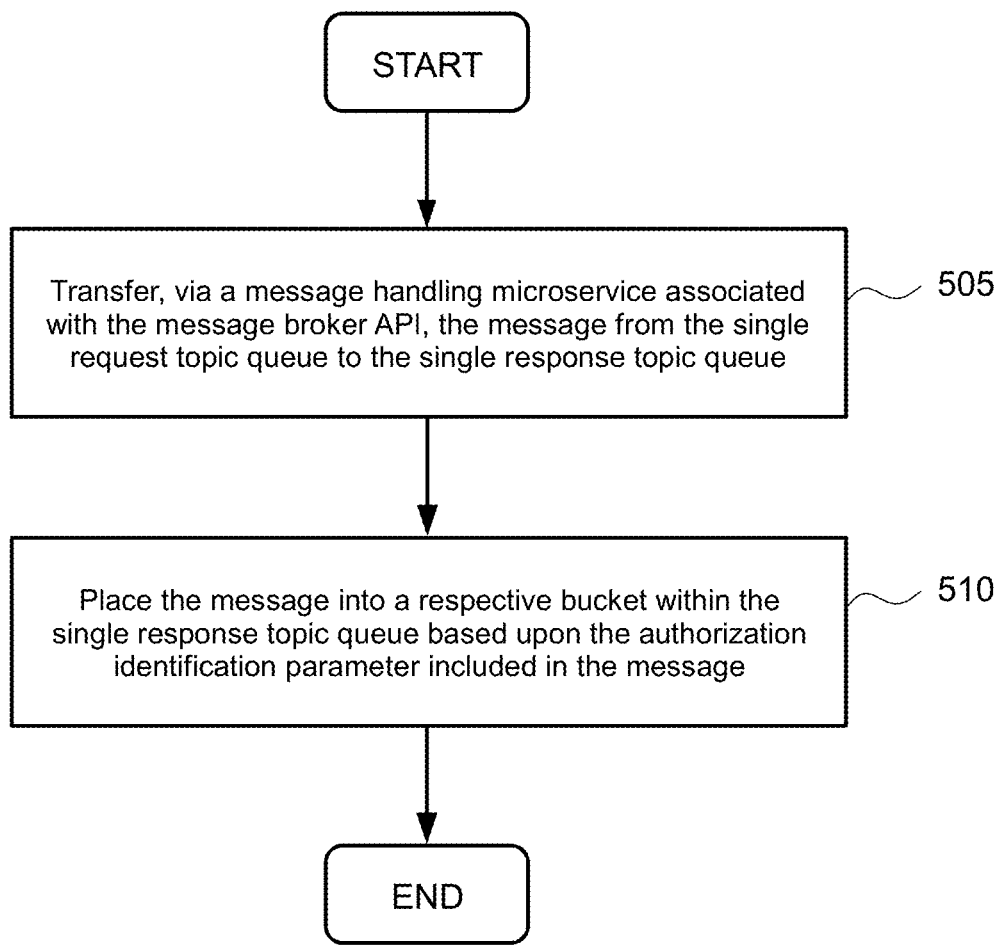
FIG. 5 illustrates a method of publishing each of at least one message to a respective bucket within a single response topic queue of a message broker application programming interface (API), according to one or more embodiments.

FIG. 5 illustrates a method 500 of publishing each of the at least one message to a respective bucket within the single response topic queue of the message broker API. The method 500 provides one or more embodiments with respect to step 415 of the method 400. The method 500 begins at step 505, where the cloud server application transfers, via a message handling microservice associated with the message broker API, the message from the single request topic queue to the single response topic queue. In the context of the various embodiments, a message handling microservice is a generic microservice configured to coordinate message handling, including message transfer, between topic queues. In an embodiment, the message handling microservice is a constituent component of the message broker API. In an alternative embodiment, the message handling microservice is communicatively coupled to the message broker API. In an additional embodiment, the message handling microservice is dedicated to message transfer from the single request topic queue to the single response topic queue. In a further embodiment, the message handling microservice sends a transfer request to the single request topic queue, obtains the message information for transfer to the single response topic queue including the authorization identification parameter(s), and receives an acknowledgment response to the transfer request from the single response topic queue upon transfer. According to such further embodiment, the message handling microservice sends the transfer request to the single request topic queue and waits for the acknowledgement response to the transfer request from the single response topic queue via at least one asynchronous programming language function call. In a further embodiment, the message handling microservice is configured to repetitively check for messages received at the single request topic queue. According to such further embodiment, the message handling microservice optionally interfaces with the single request topic queue at periodic intervals and/or at designated points in time, e.g., in accordance with a messaging protocol. According to one or more alternative embodiments in which the single request topic queue of the message broker API and the single response topic queue of the message broker API are combined into a single request-response topic queue, the cloud server application skips step 505 and begins the method 500 at step 510, since the combination of the single request topic queue and the single response topic queue renders the transfer step unnecessary for publication.

At step 510, the cloud server application places the message into a respective bucket within the single response topic queue based upon the authorization identification parameter included in the message. According to step 510, the cloud server application pushes the message to the single response topic queue. The cloud server application pushes the message via the message handling microservice of the message broker API, unless the single request topic queue and the single response topic queue are combined according to one or more alternative embodiments. Upon arrival at the single response topic queue, the message is automatically routed to a respective bucket based upon the authorization identification parameter. Bucket-based publication enables a new design pattern paradigm in the context of event based communication. Bucket-based communication according to the methods described herein facilitates targeted publication to a topic queue, specifically the single response topic queue. In a related embodiment, the cloud server application places the message into a respective bucket within the single response topic queue by storing the message in a queue partition corresponding to the respective bucket. Such queue partition optionally is a physical partition of the single response topic queue or alternatively is a separate data structure associated with the respective bucket. In the event that the message includes multiple authorization identification parameters, at step 510 the cloud server application places the message into multiple respective buckets within the single response topic queue based upon the multiple authorization identification parameters included in the message.

According to one or more alternative embodiments in which the single request topic queue and the single response topic queue are combined into a single request-response topic queue, the cloud server application publishes each of the at least one message to a respective bucket within the single response topic queue in the context of step 415 of the method 400 and in the context of the method 500 by publishing to a respective bucket within the single request-response topic queue. Thus, according to such one or more alternative embodiments, at step 510 the cloud server application places the message into a respective bucket within the single request-response topic queue based upon the authorization identification parameter included in the message. According to such one or more alternative embodiments, each of the at least one publisher microservice among the plurality of client microservices publishes a respective message to the single request-response topic queue, and each of the at least one subscriber microservice among the plurality of client microservices subscribes to the single request-response topic queue. In a related embodiment, the cloud server application places the message into a respective bucket within the single request-response topic queue by storing the message in a queue partition corresponding to the respective bucket. Such queue partition optionally is a physical partition of the single request-response topic queue or alternatively is a separate data structure associated with the respective bucket.

In sum, publishing each of the at least one message according to the method 500 includes transferring, via a message handling microservice associated with the message broker API, the message from the single request topic queue to the single response topic queue and placing the message into a respective bucket within the single response topic queue based upon the authorization identification parameter included in the message.

Figure 6:
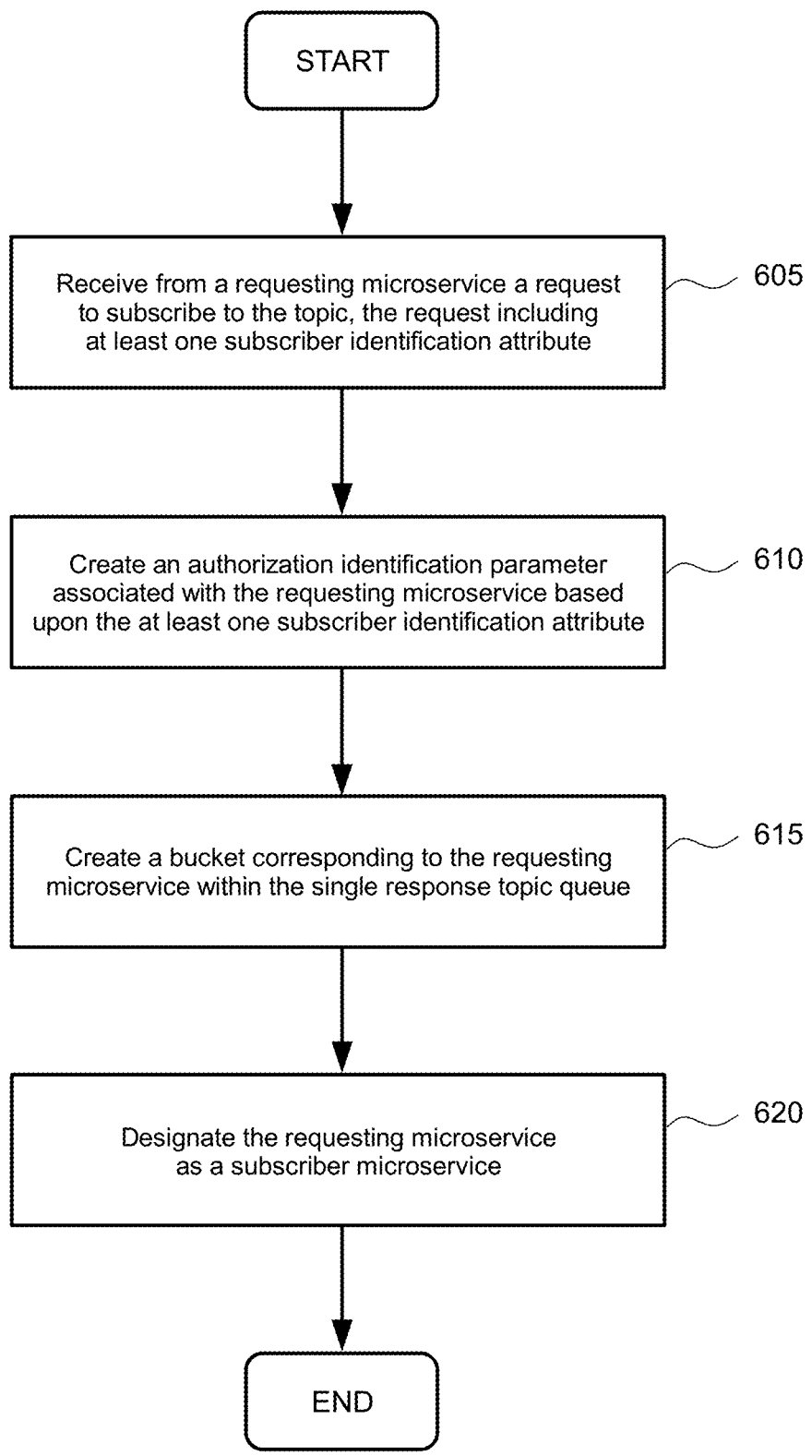
FIG. 6 illustrates a method of configuring microservice subscription, according to one or more embodiments.

FIG. 6 illustrates a method 600 of configuring microservice subscription. According to the method 600, the cloud server application configures the single response topic queue to which each of the at least one message is published according to the methods 400 and 500. The method 600 begins at step 605, where the cloud server application receives from a requesting microservice among the plurality of client microservices a request to subscribe to the topic with which the at least one message is associated. The request received at step 605 includes at least one subscriber identification attribute. At step 610, the cloud server application creates an authorization identification parameter associated with the requesting microservice based upon the at least one subscriber identification attribute. At step 615, the cloud server application creates a bucket corresponding to the requesting microservice within the single response topic queue. According to step 615, the cloud server application creates a link between the authorization identification parameter associated with the requesting microservice and the bucket. Based upon such link, the cloud server application creates a correspondence relationship between the bucket and the requesting microservice. In an embodiment, the cloud server application is configured to handle new subscribers at runtime. According to such embodiment, the cloud server application is configured to create a bucket for the requesting microservice associated with the single response topic queue at runtime, thus dynamically scaling the single response topic queue in response to subscriber additions. In the context of one or more alternative embodiments in which the single request topic queue and the single response topic queue are combined into a single request-response topic queue, the cloud server application creates a bucket for the requesting microservice within the single request-response topic queue. At step 620, the cloud server application designates the requesting microservice as a subscriber microservice among the at least one subscriber microservice. In a related embodiment, the cloud server application sends a subscription confirmation message to the requesting microservice including the authorization identification parameter and relevant bucket information. In a further related embodiment, the cloud server application optionally adds the requesting microservice to a data structure including the at least subscriber microservice and/or labels the requesting microservice as a subscriber microservice in data records tracking the at least one subscriber microservice. In the context of the various embodiments, microservice topic subscription is an implementation of a publish-subscribe messaging pattern.

In sum, configuring microservice subscription according to the method 600 includes receiving from a requesting microservice among the plurality of client microservices a request to subscribe to the topic, the request including at least one subscriber identification attribute, creating an authorization identification parameter associated with the requesting microservice based upon the at least one subscriber identification attribute, creating a bucket corresponding to the requesting microservice within the single response topic queue, and designating the requesting microservice as a subscriber microservice among the at least one subscriber microservice.

In an embodiment, the cloud server application, via the message broker API described in the context of the method 400 and related methods, handles message publication and/or subscription with respect to one or more individual client microservices among the plurality of client microservices. In a further embodiment, the cloud server application, via the message broker API described in the context of the method 400 and related methods, handles messages among the plurality of client microservices that facilitate completion of a set of tasks associated with a workflow. In the context of the various embodiments, a workflow incudes series of tasks, e.g., a chain or sequence of tasks. A workflow is associated with a group of messages sent for purposes of completing the series of tasks. For instance, a workflow in accordance with the various embodiments may be a workflow to determine client eligibility with respect to certain services or benefits, e.g., an insurance client eligibility workflow. A single topic queue, e.g., a single request-response topic queue in accordance with the previously described one or more alternative embodiments, is configured to handle multiple tasks or other aspects associated with a single workflow. Optionally, one client microservice among the plurality of client microservices completes at least one task associated with a workflow and then publishes via the message broker API one or more workflow-related messages to at least one other client microservice among the plurality of client microservices. For instance, a first client microservice among the plurality of client microservices may complete at least one task associated with a workflow and then may publish via the message broker API one or more workflow-related messages to a second client microservice among the plurality of client microservices, the second client microservice may complete at least one additional task associated with the workflow based upon the publication received from the first client microservice and then may publish via the message broker API one or more additional workflow-related messages to a third client microservice among the plurality of client microservices, and so forth.

In an embodiment, the cloud server application, via the message broker API described in the context of the method 400 and related methods, accommodates at least one dedicated condition handling microservice among the plurality of client microservices configured to distribute messages to other client microservices among the plurality of client microservices based upon one or more conditions associated with a workflow. According to such embodiment, each of the other client microservices is configured to handle a designated set of one or more conditions associated with the workflow. According to such embodiment, the at least one dedicated condition handling microservice among the plurality of client microservices addresses one or more workflow conditions by publishing via the message broker API respective messages to one or more other client microservices based upon the one or more workflow conditions. Optionally, a dedicated condition handling microservice publishes a message to one or more other client microservices based upon satisfaction of one or more designated sets of conditions. For instance, in the context of handling messages based upon conditions of an insurance client eligibility workflow, a first dedicated condition handling microservice among the plurality of client microservices may publish a message to a second microservice among the plurality of client microservices based upon satisfaction of a first set of conditions, e.g., responsive to determining that client age is 25 to 50 and that client salary is less than $100,000, and the first dedicated condition handling microservice may publish a message to a third microservice among the plurality of client microservices based upon satisfaction of a second set of conditions, e.g., responsive to determining that client age is greater than 50 and that client salary is greater than or equal to $100,000, and so forth.

Figure 7:
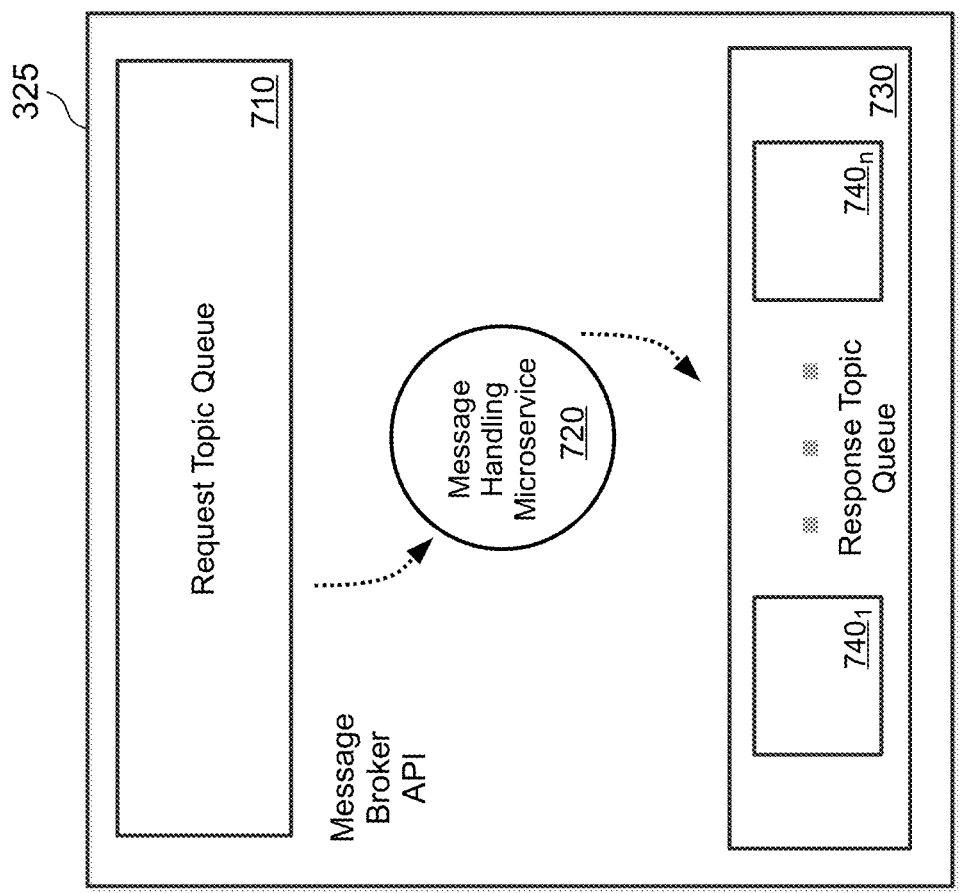
FIG. 7 illustrates a message broker API implementation, according to one or more embodiments.

FIG. 7 illustrates an implementation of message broker API 325, according to one or more embodiments. As shown, message broker API 325 according to the implementation depicted in FIG. 7 includes a request topic queue 710, a message handling microservice 720, and a response topic queue 730. Response topic queue 730 includes buckets $740_1$ to $740_n$ corresponding to respective subscriber microservices, e.g., among client microservices $360_1$ to $360_n$. Request topic queue 710 is an example implementation of the single request topic queue discussed in the context of the method 400 and related methods. Response topic queue 730 is an example implementation of the single response topic queue discussed in the context of the method 400 and related methods.

Figure 8:
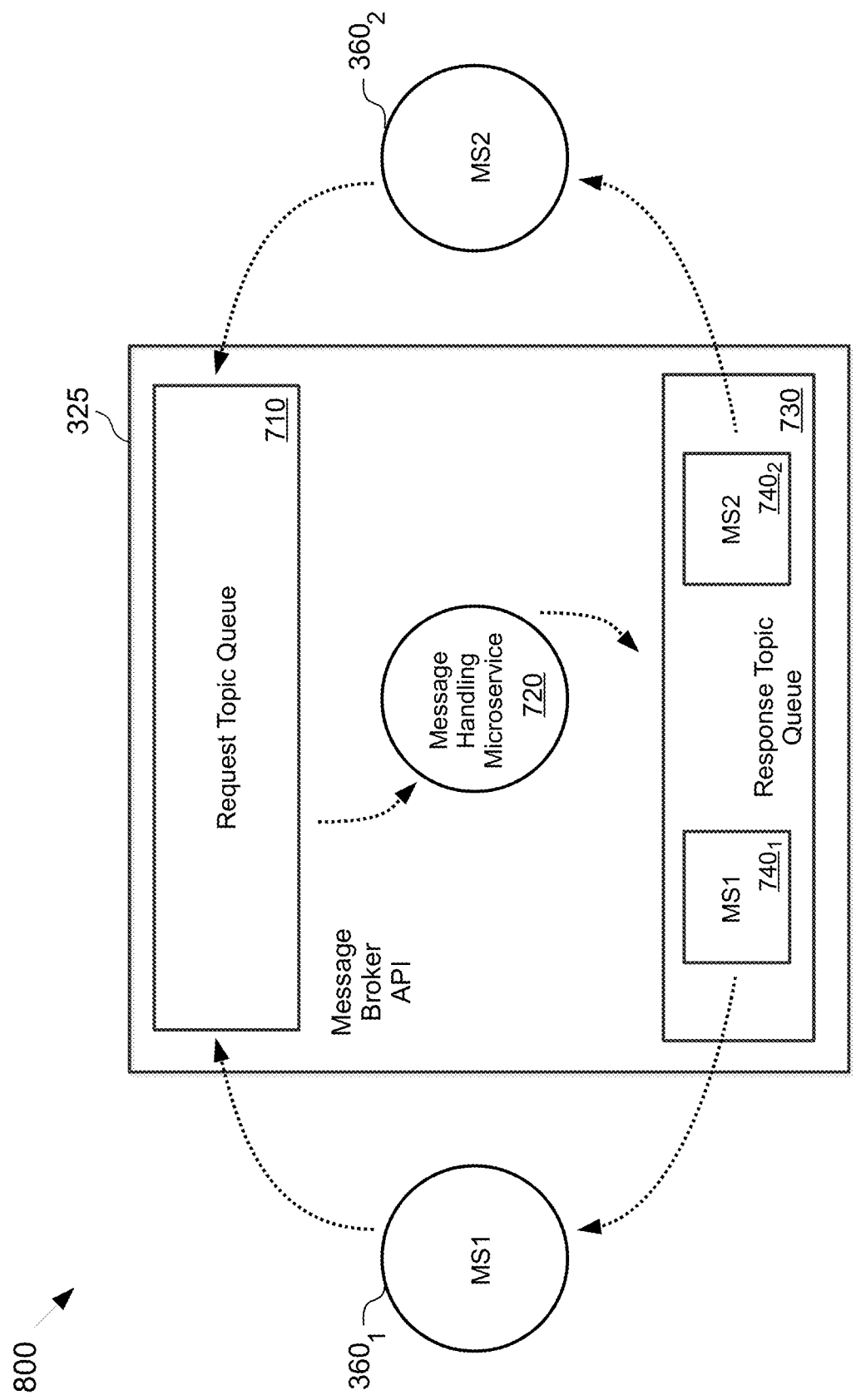
FIG. 8 illustrates an example scenario involving the message broker API implementation illustrated in FIG. 7, according to one or more embodiments.

FIG. 8 illustrates an example scenario 800 involving the implementation of message broker API 325 as illustrated in FIG. 7. As shown in FIG. 8, client microservice $360_1$ (MS1) and client microservice $360_2$ (MS2) both publish to a topic, as indicated by the respective arrows from MS1 and MS2 to request topic queue 710, and subscribe to the topic, as indicated by the arrow from bucket 740$_1$ within response topic queue 730 to MS1 and as indicated by the arrow from bucket 740$_2$ within response topic queue 730 to MS2. Message handling microservice 720 transfers messages to be published by client microservice 360$_1$ and client microservice 360$_2$ from request topic queue 710 to response topic queue 730. One or more transferred messages to be published to MS1 are placed in bucket 740$_1$ within response topic queue 730, at which point the one or more transferred messages are available for subscriber microservice MS1. One or more transferred messages to be published to MS2 are placed in bucket 740$_2$ within response topic queue 730, at which point the one or more transferred messages are available for subscriber microservice MS2.

As indicated by example scenario 800 depicted in FIG. 8, the implementation of message broker API 325 illustrates message handling with respect to respective individual client microservices MS1 and MS2 in accordance with the various embodiments described herein. While client microservices MS1 and MS2 are depicted as both publisher microservices and subscriber microservices, a client microservice associated with message broker API 325 optionally is only a publisher microservice and not a subscriber microservice, or conversely a client microservice associated with message broker API 325 optionally is only a subscriber microservice and not a publisher microservice.

Figure 9:
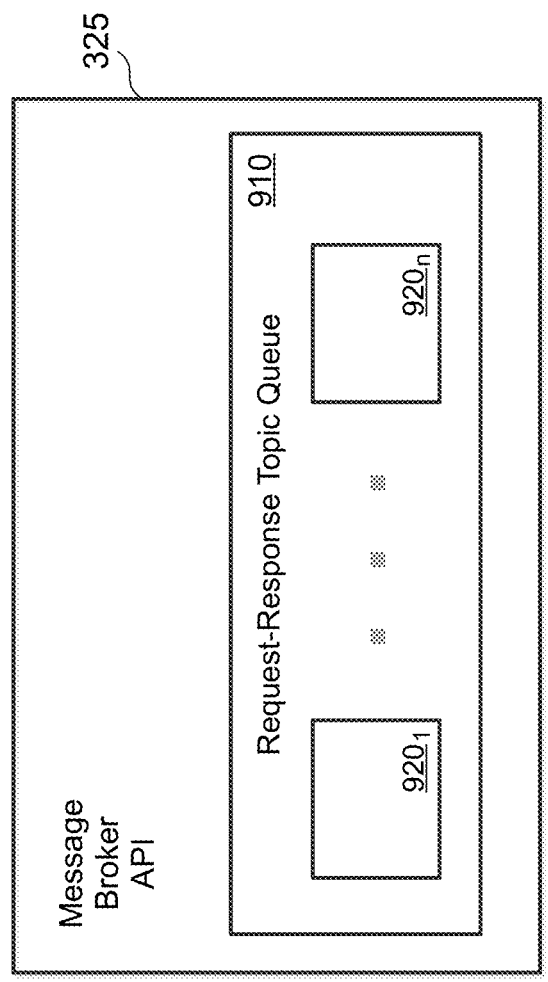
FIG. 9 illustrates a further message broker API implementation, according to one or more embodiments.

FIG. 9 illustrates a further implementation of message broker API 325, according to one or more embodiments. As shown, message broker API 325 according to the further implementation depicted in FIG. 9 includes a request-response topic queue 910. Request-response topic queue 910 includes buckets 920$_1$ to 920$_n$ corresponding to respective subscriber microservices, e.g., among client microservices 360$_1$ to 360$_n$. FIG. 9 illustrates message broker API 325 in accordance with one or more alternative embodiments in which the single request topic queue of the message broker API and the single response topic queue of the message broker API as described in the method 400 and related methods are combined into a single request-response topic queue. Request-response topic queue 910 is an example implementation of the single request-response topic queue discussed in the context of the one or more alternative embodiments.

Figure 10:
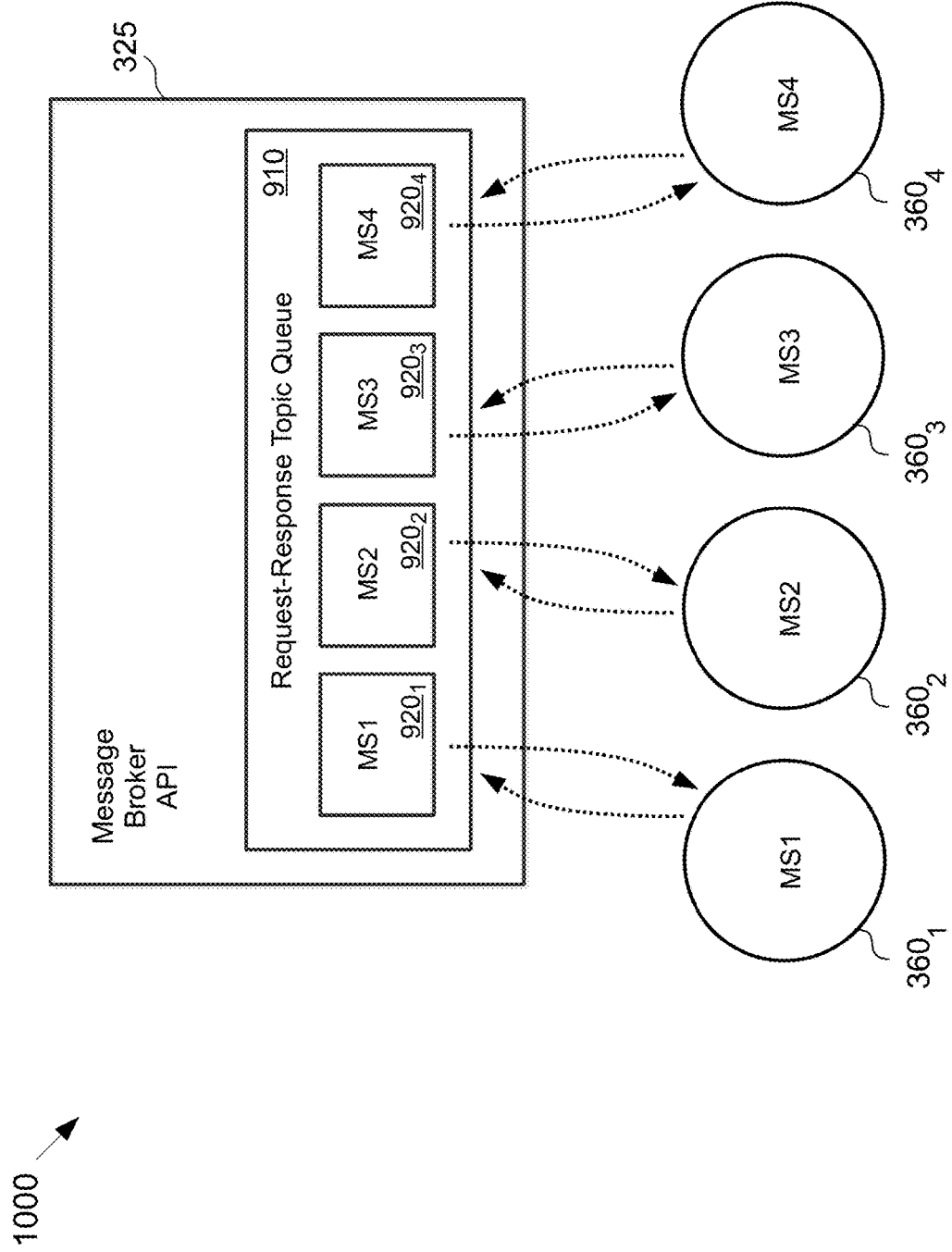
FIG. 10 illustrates an example scenario involving the further message broker API implementation illustrated in FIG. 9, according to one or more embodiments.

FIG. 10 illustrates an example scenario 1000 involving the further implementation of message broker API 325 as illustrated in FIG. 9. As shown in FIG. 10, client microservice 360$_1$ (MS1), client microservice 360$_2$ (MS2), client microservice 360$_3$ (MS3), and client microservice 360$_4$ (MS4) each publish and subscribe to a topic. Message publication to the topic by the respective client microservices MS1, MS2, MS3, and MS4 are depicted by arrows from the respective client microservices MS1, MS2, MS3, and MS4 to request-response topic queue 910. Message subscription to the topic by client microservice MS1 is depicted by the arrow from bucket 920$_1$ within request-response topic queue 910 to MS1. Message subscription to the topic by client microservice MS2 is depicted by the arrow from bucket 920$_2$ within request-response topic queue 910 to MS2. Message subscription to the topic by client microservice MS3 is depicted by the arrow from bucket 920$_3$ within request-response topic queue 910 to MS3. Message subscription to the topic by client microservice MS4 is depicted by the arrow from bucket 920$_4$ within request-response topic queue 910 to MS4.

As indicated by the example scenario 1000 depicted in FIG. 10, the further implementation of message broker API 325 illustrates message handling with respect to client microservices MS1, MS2, MS3, and MS4 that optionally are part of a workflow of client microservices, e.g., an insurance client eligibility workflow. In the context of such particular instance, an authorization identification parameter included in a message associated with the client eligibility workflow optionally corresponds to a microservice configured to handle the message based upon one or more conditions, and accordingly the cloud server application publishes such message to the bucket corresponding to such microservice based upon the authorization identification parameter. As illustrated in the further implementation of message broker API 325 in FIG. 9 and the example scenario 1000 of FIG. 10, there is no message handling microservice between a request topic queue and a response topic queue, since functionality of respective request and response topic queues are combined into request-response topic queue 910. Thus, in accordance with the further implementation of message broker API 325 as illustrated in FIG. 9, the cloud server application handles the entirety of a client microservice workflow via request-response topic queue 910. According to an embodiment in which there is least one dedicated condition handling microservice, in example scenario 1000 depicted in FIG. 10, MS1 optionally is a dedicated condition handling microservice publishing one or more respective messages to other client microservices MS2, MS3, and/or MS4 based upon workflow conditions. According to such embodiment, dedicated condition handling microservice MS1 may publish a message to microservice MS2 based upon satisfaction of a first set of conditions, dedicated condition handling microservice MS1 may publish a message to microservice MS3 based upon satisfaction of a second set of conditions, and dedicated condition handling microservice MS1 may publish a message to microservice MS4 based upon satisfaction of a third set of conditions.

The descriptions of the various embodiments have been presented for purposes of illustration but are not intended to be exhaustive or limited to the embodiments disclosed. All kinds of modifications made to the described embodiments and equivalent arrangements should fall within the protected scope of the various embodiments. Hence, the scope should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein is chosen to best explain the principles of the various embodiments, the practical application or technical improvement over technologies found in the marketplace, or to enable others of ordinary skill in the art to understand the various embodiments.

What is claimed is:

1. A computer-implemented method of coordinating asynchronous communication among a plurality of client microservices, the method comprising:
receiving at a single request-response topic queue of a message broker application programming interface (API) of a cloud server application at least one message associated with a topic from at least one publisher microservice among the plurality of client microservices, wherein the single request-response topic queue combines functionality of a single request topic queue and functionality of a single response topic queue, and wherein a new bucket is created among a plurality of buckets within the single request-response topic queue for a requesting microservice among the plurality of client microservices in response to a request to subscribe to the topic;

identifying, by the cloud server application, an authorization identification parameter included in each of the at least one message; and publishing, by the cloud server application, each of the at least one message to a respective bucket among the plurality of buckets, wherein the respective bucket corresponds to one of at least one subscriber microservice among the plurality of client microservices that is associated with the authorization identification parameter included in the message.

2. The computer-implemented method of claim 1, wherein one or more of the at least one publisher microservice are among the at least one subscriber microservice.

3. The computer-implemented method of claim 1, wherein publishing each of the at least one message comprises:

placing the message into the respective bucket within the single request-response topic queue based upon the authorization identification parameter included in the message.

4. A computer program product comprising a computer readable storage medium having program instructions embodied therewith for coordinating asynchronous communication among a plurality of client microservices, the program instructions executable by a computing device to cause the computing device to:

receive at a single request-response topic queue of a message broker API of a cloud server application at least one message associated with a topic from at least one publisher microservice among the plurality of client microservices, wherein the single request-response topic queue combines functionality of a single request topic queue and functionality of a single response topic queue, and wherein a new bucket is created among a plurality of buckets within the single request-response topic queue for a requesting microservice among the plurality of client microservices in response to a request to subscribe to the topic;

identify, by the cloud server application, an authorization identification parameter included in each of the at least one message; and publish, by the cloud server application, each of the at least one message to a respective bucket among the plurality of buckets, wherein the respective bucket corresponds to one of at least one subscriber microservice among the plurality of client microservices that is associated with the authorization identification parameter included in the message.

5. The computer program product of claim 4, wherein one or more of the at least one publisher microservice are among the at least one subscriber microservice.

6. The computer program product of claim 4, wherein publishing each of the at least one message comprises:

placing the message into the respective bucket within the single request-response topic queue based upon the authorization identification parameter included in the message.

7. A system comprising:

at least one processor; and a memory storing a cloud server application, which, when executed on the at least one processor, performs an operation of coordinating asynchronous communication among a plurality of client microservices, the operation comprising:

receiving at a single request-response topic queue of a message broker API of the cloud server application at least one message associated with a topic from at least one publisher microservice among the plurality of client microservices, wherein the single request-response topic queue combines functionality of a single request topic queue and functionality of a single response topic queue, and wherein a new bucket is created among a plurality of buckets within the single request-response topic queue for a requesting microservice among the plurality of client microservices in response to a request to subscribe to the topic;

identifying, by the cloud server application, an authorization identification parameter included in each of the at least one message; and publishing, by the cloud server application, each of the at least one message to a respective bucket among the plurality of buckets, wherein the respective bucket corresponds to one of at least one subscriber microservice among the plurality of client microservices that is associated with the authorization identification parameter included in the message.

8. The system of claim 7, wherein one or more of the at least one publisher microservice are among the at least one subscriber microservice.

9. The system of claim 7, wherein publishing each of the at least one message comprises:

placing the message into the respective bucket within the single request-response topic queue based upon the authorization identification parameter included in the message.

\* \* \* \* \*